United States Patent [19]

Boxrud

[11] 4,232,879

[45] Nov. 11, 1980

[54] EQUIPMENT TRAILER

[76] Inventor: Phillip E. Boxrud, Route 3, Madelia, Minn. 56062

[21] Appl. No.: 10,624

[22] Filed: Feb. 9, 1979

[51] Int. Cl.³ .................... B60P 3/10; B62D 53/06
[52] U.S. Cl. ......................... 280/656; 280/43.23; 280/414 R; 414/458
[58] Field of Search .............. 280/656, 638, 42, 43, 280/43.17, 43.23, 414 R, 179 R, 179 B, 35, 639; 414/458, 459

[56] References Cited

U.S. PATENT DOCUMENTS

| | | | |
|---|---|---|---|
| 2,629,607 | 2/1953 | Roubeck | 280/179 R |
| 3,430,791 | 3/1969 | Moss | 280/656 |
| 3,442,409 | 5/1969 | Larson | 280/656 |
| 3,521,773 | 7/1970 | Geister | 280/43.23 |
| 3,539,065 | 11/1970 | Brownell | 414/458 |
| 3,572,743 | 3/1971 | Parr | 280/43.23 |
| 3,698,734 | 10/1972 | Drake | 280/656 |
| 3,776,400 | 12/1973 | Schwartz | 280/43.23 |
| 3,861,716 | 1/1975 | Baxter | 280/656 |
| 3,913,934 | 10/1975 | Koehn | 280/656 |

FOREIGN PATENT DOCUMENTS 2329501   5/1977   France .................... 280/638

Primary Examiner—John J. Love
Assistant Examiner—Randall A. Schrecengost
Attorney, Agent, or Firm—Kinney, Lange, Braddock, Westman and Fairbairn

[57] ABSTRACT

An equipment trailer, and more particularly a trailer adapted for hauling large boats and similar objects which has self-lifting framework, is adjustable in lateral width so that it can be used for hauling wide loads, and may be converted to a narrower width for empty transport merely by operation of a hydraulic cylinder that operates through linkages to cause the side rails to be moved in or out relative to a central axis. The unit includes removable cross members and specifically designed removable hangers for such cross members that are attachable to the longitudinal side frame members when the unit is to be used, and which are quickly attached and detached from the side frame members.

12 Claims, 13 Drawing Figures

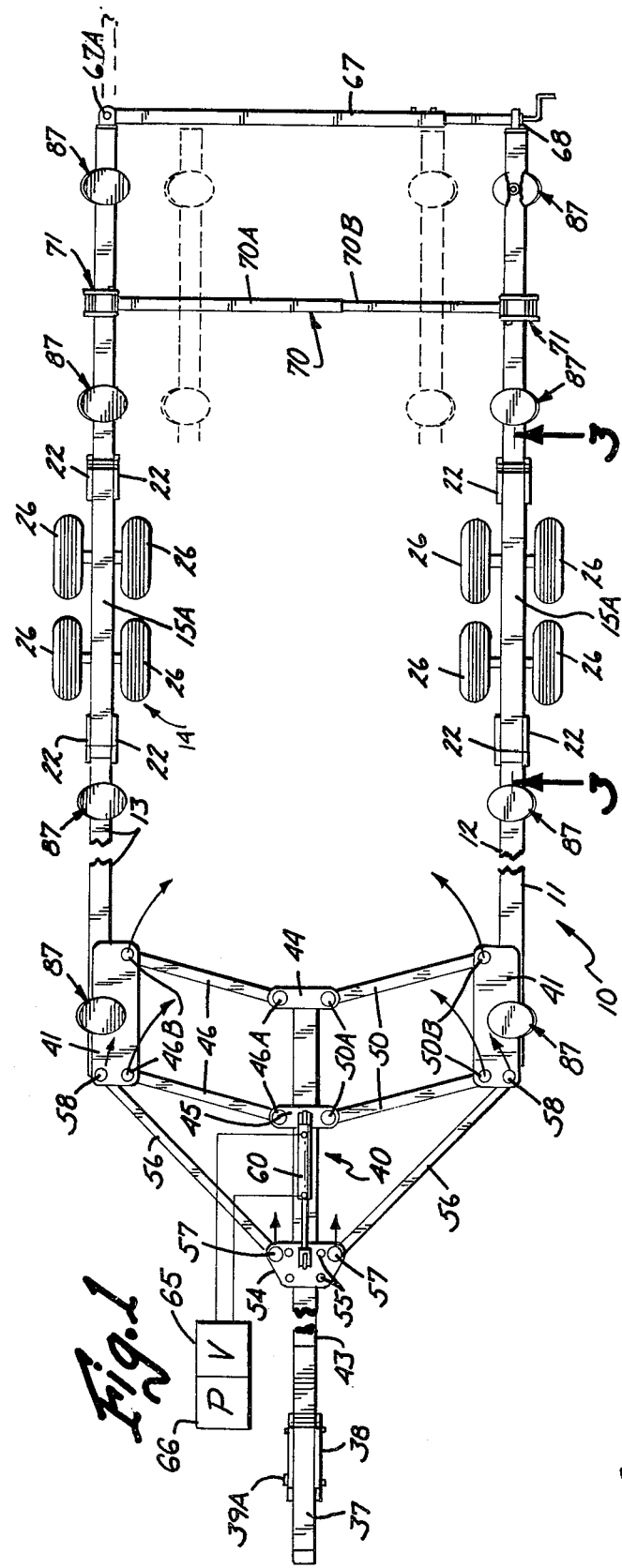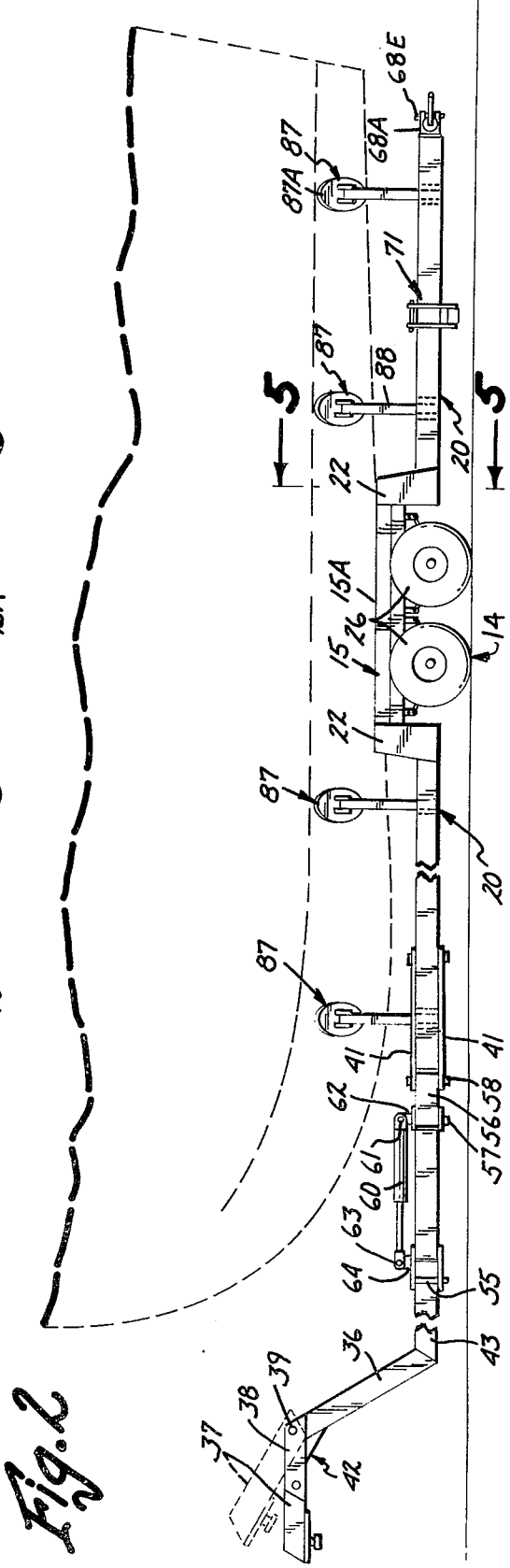

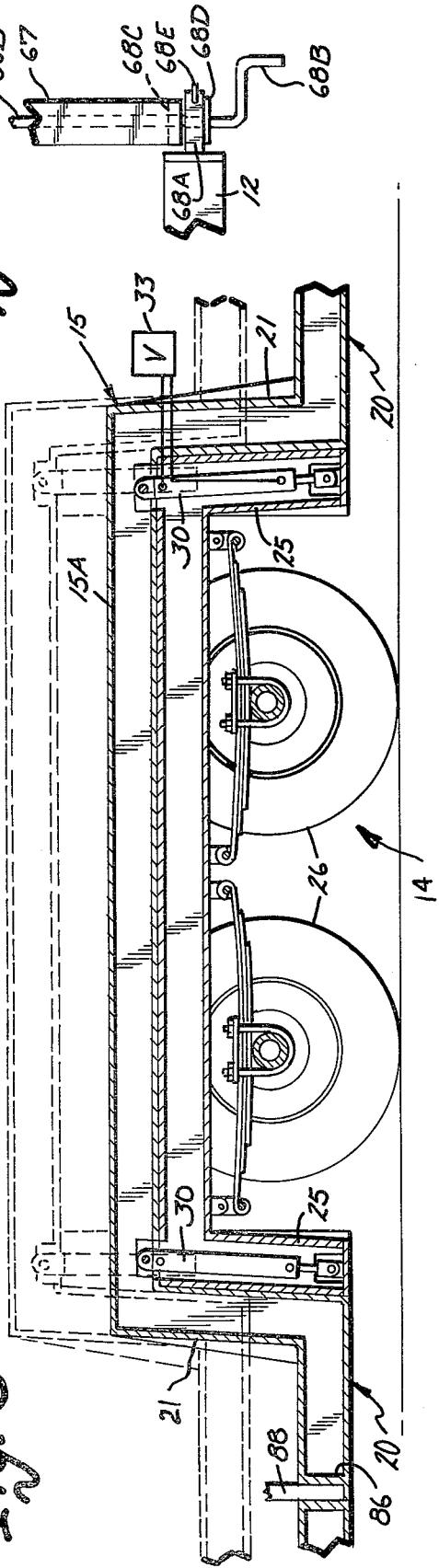

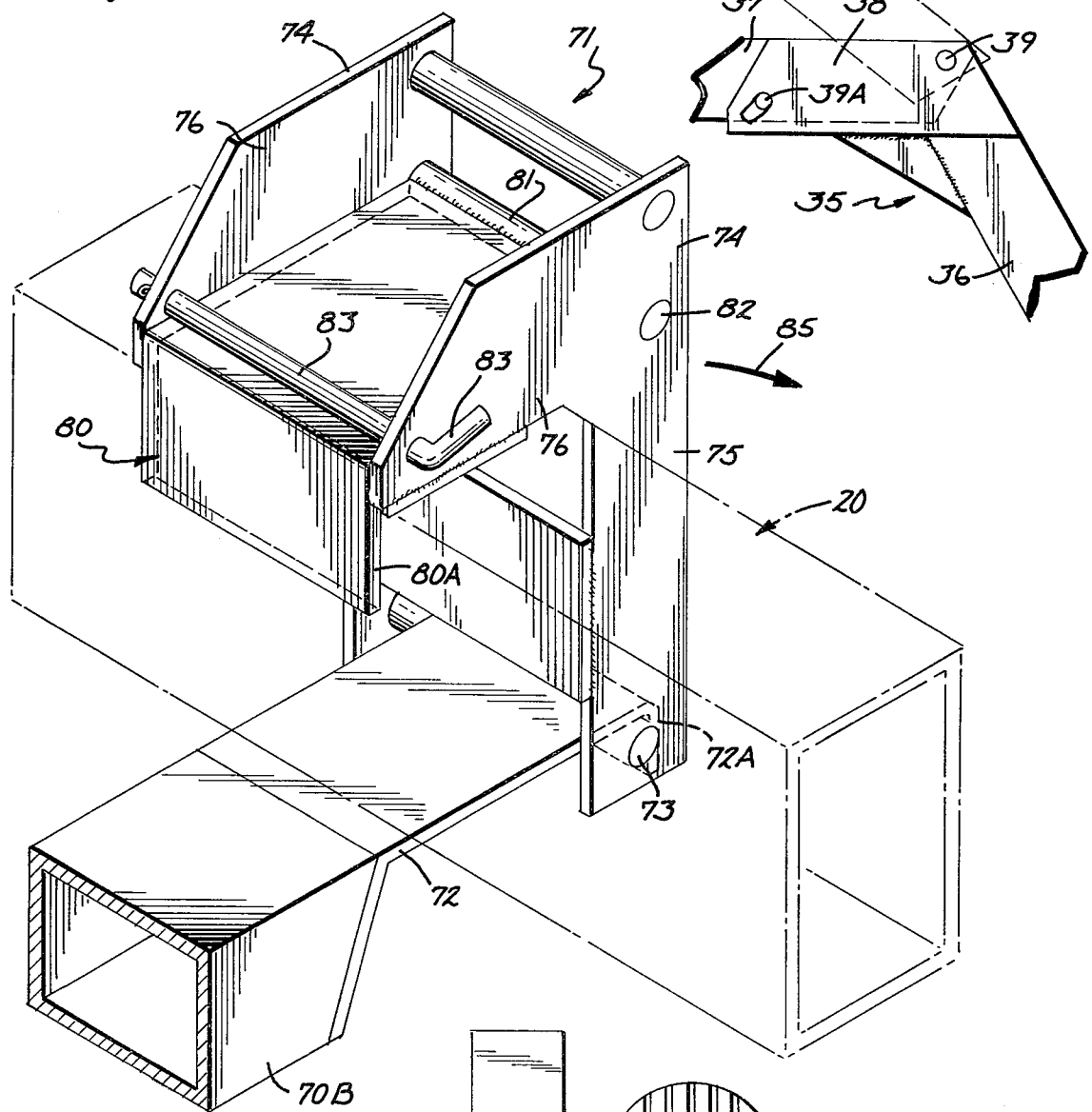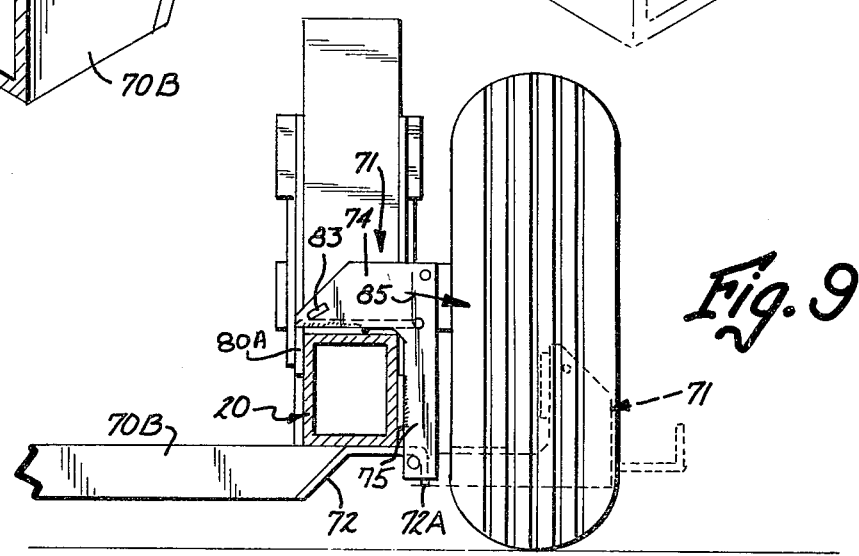

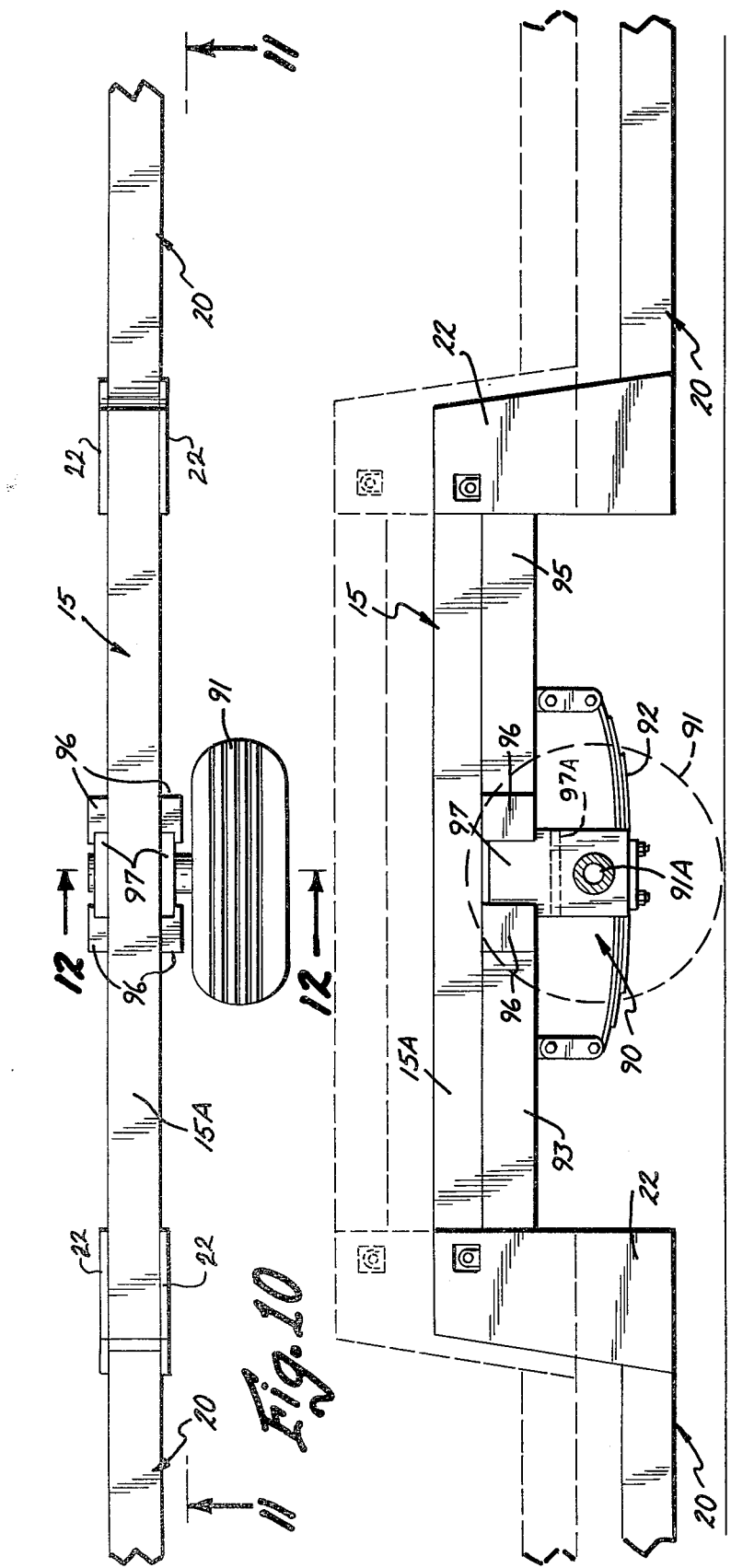
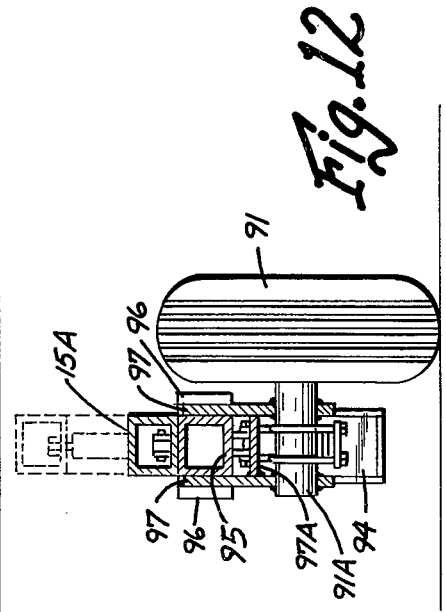

EQUIPMENT TRAILER

BACKGROUND OF THE INVENTION

1. Field of the Invention

The present invention relates to trailers, and more particularly to trailers that have removable cross members, and can be used for transporting equipment such as boats and the like.

2. Prior Art

In the prior art various trailers have been provided which are used for boat hauling. For example U.S. Pat. No. 3,539,065 shows a boat trailer which has front and rear wheels on side frame members. The wheel supports for the rear have self-contained jacks and when coupled to the frame will raise and lower the frame relative to the ground. U.S. Pat. No. 3,430,791 also shows a semi-trailer that operates in substantially the same manner.

Trailers also have been advanced which can be changed in lateral width. For example, U.S. Pat. No. 3,698,734 shows such a trailer which has linkages and a hitch pole, which can be manually adjusted to cause the side frame members to be moved inwardly and outwardly toward each other and pinned in place. The pins in this particular device are pneumatically actuated cylinders. Another form of adjustable width trailer is shown in U.S. Pat. No. 3,442,409 which has a central pivot at the leading end of the trailer and a cross cylinder that may cause the two portions of the trailer to move about the central pivot. Further, the supports for the trailer in U.S. Pat. No. 3,442,409 are provided with vertically actuated hydraulic cylinders that permit supporting the front portions of the frame on the ground. A further type of adjustable width wheels for a trailer that are mechanically latched in two positions is shown in U.S. Pat. No. 3,913,345. The wheels of the trailer are near the rear portion, and the wheels themselves can be moved from a working position to a narrowed position through pivoting link assemblies. The frame of the trailer, however, is not adjustable.

It should also be noted that the aforementioned U.S. Pat. Nos. 3,442,409 and 3,539,065 disclose cross members or beams for the trailer, which are supported in apertures in the longitudinal beams and are merely slid in and out of position spanning the space between the beams.

SUMMARY OF THE INVENTION

The present invention relates to a trailer for hauling equipment or articles such as boats, which can be raised and lowered for ease of loading, and which as shown includes hydraulic cylinders mounted on the longitudinally extending side beams and react against the ground engaging wheel supports to raise and lower the frame relative to the wheel supports. The longitudinal side frame members can be changed in relative width through the operation of a linkage that provides parallel motion to the side members between extended and retracted positions, or at any desired position inbetween the two extremes. The trailer does have, as shown, removable cross beams that extend between the longitudinally extending beams. These beams are attached with unique type of clamps which permit easy removal and reattaching of the cross beams. The cross beams are also adjustable or telescoping so that they will accommodate changes in the width between the longitudinal beams.

BRIEF DESCRIPTION OF THE DRAWINGS

FIG. 1 is a top plan view of a trailer made according to the present invention;

FIG. 2 is a side elevational view of FIG. 1;

FIG. 2A is a fragmentary top view of a rear of the trailer showing a retainer for a locking rear cross beam;

FIG. 3 is a fragmentary sectional view taken as on line 3—3 in FIG. 1;

FIG. 4 is a fragmentary side view of the support wheel mounting;

FIG. 5 is a sectional view taken on line 5—5 in FIG. 2;

FIG. 6 is a sectional view taken on substantially the same line as FIG. 5 showing the side frame members in a raised position;

FIG. 7 is a side view of a collapsing gooseneck connection used with the present invention;

FIG. 8 is a perspective view of a cross member hanger used with the device of FIG. 1;

FIG. 9 is an end view of the device of FIG. 8 with the longitudinal frame member in cross section showing a wheel support of a modified form which is detailed in FIGS. 10 to 12;

FIG. 10 is a top view of a modified wheel support of the present invention;

FIG. 11 is a side view taken along line 11—11 in FIG. 10; and

FIG. 12 is a sectional view taken along 12—12 in FIG. 10.

DESCRIPTION OF THE PREFERRED EMBODIMENTS

An equipment trailer indicated generally at 10 comprises a frame 11 including first and second longitudinally extending main frame members 12 and 13, respectively. The frame members 12 and 13 extend longitudinally in fore and aft direction, and include running gear assemblies 14 and associated with each of the beam assemblies as shown. Each of the beams are provided with a vertically offset bridge section 15. Each of the beams 12 and 13 is identically constructed, and includes sections 20,20 that form the main horizontal portions of the beam, and which are attached through gusset plates 22 to the overhead beam portion 15A of the bridge assembly. If desired, vertical beam connecting members indicated at 21 can also be provided between the beam portions 20,20 and the overhead beam 15A. The gusset plates 22 as shown, are made so that they are outside of the beam portions 20 and 15A, and provide guides for the running gear assembly 14 on each side of the unit.

The running gear assemblies 14, as shown, each comprise a main beam 24, and vertical beam sections 25,25 which are fixed to and extend down below the main beam 24. Suitable wheel assemblies 26 are rotatably mounted in a normal manner to axles that are mounted to the beam 24. As shown, the wheel assemblies 26 are dual wheels mounted in tandem on the beam 24, but of course one set of dual wheels may be used for trailers made according to this form of the invention, or triple sets of duals can be used on each of the longitudinally extending beams. Bogie wheels also may be used.

It should be noted that the vertical beam members 25 of the wheel assemblies fit between and are guided by the gusset plates 22 on opposite sides of the beam 15A and at both the front and rear ends of the bridge beam 15A. The beams 12 and 13 can be raised relative to the wheel support units 14 through the use of hydraulic cylinders indicated at 30,30. There is one of the cylinders 30 in each of the beams 25, at the front and rear portions of the bridge framework. As shown, the cylinders 30,30 are double acting cylinders and have their base members connected to suitable brackets 31 fastened to the interior of the cross beams 15A of the bridge members 15. The beams 24 have openings so that the cylinders 30 will fit down through the beams 24 (all of the beams are rectilinear cross section tubes), and extend downwardly into the tube sections 25. The rod ends of the cylinders 30 are pinned as at 32 on the interior of these tube sections 25. Suitable valve means, for example shown schematically at 33, operating from a suitable source of hydraulic pressure as will be explained, and can be operated so that the cylinders 30 will work in parallel simultaneously to raise and lower the side frame members relative to the wheel support assemblies. This raising and lowering is on a straight line direct acting basis, and of course the large end of the piston of the double acting cylinder is used for supporting the loads that would be on the beams 20 and bridge 15. The load would be that which is carried by the trailer itself.

The raised position can be seen in FIG. 6 and the lowered position is shown in FIGS. 3 and 5.

To accommodate movement of the horizontal beams as they are raised and lowered, the front end of the trailer, as shown, also moves. The hitch is made to break to accommodate the movement of the trailer bed. The trailer has a fifth wheel gooseneck or hitch assembly indicated generally at 35. The assembly includes an upright pole member 36 coupled to an upper horizontal member 37 through a lockable pivot connection (see FIGS. 1, 2 and 7) comprising an upwardly open U shaped cradle 38 in which member 37 fits. A pivot pin 39 connects the member 37 to cradle 38 and in use is locked in place with a lock pin 39A that passes through the legs of cradle 38 to lock the horizontal member 37 in place. For lowering the frame member, the pin 39A is removed and as the frame lowers, the member 37 will pivot to permit this movement. The pin for the fifth wheel has enough freedom of movement to permit member 37 to pivot. When the boat is loaded and the side beams again raised, the member 37 moves back into the cradle 38 and the lock pin 39A will be reinserted.

The forward end of the trailer includes a width adjusting mechanism illustrated generally at 40. It can be seen that each of the beams 12 and 13 has a frame bracket 41,41 that is welded to the ends of the longitudinally extending beams and is used for supporting the fifth wheel hitch assembly 35. The hitch assembly, in addition to the upright member 36 and member 37, includes a longitudinally, generally horizontal pole section 43. The pole section 43 is along the same level or plane as the beams 12 and 13. The pole section 43 is also a rectangular or square cross section tube, and at the rear end of the pole 43, a first bracket 44 is fixed to the pole, and a second bracket 45 is also fixed to the pole and spaced forwardly of bracket 44. The brackets 45 and 46 each include a pair of aligning plates, one on the top of the pole 43 and the other on the bottom of the pole 43. A first pair of parallel links 46 are pivotally connected as at 46A to the brackets 44 and 45, respectively, and at 46B to the bracket 41 on the beam 13. A second pair of parallel links indicated at 50 extend between the brackets 44 and 45 and the brackets 41 on the beams 12 and 13. The links 50 are connected as at 50A to the brackets 44 and 45, respectively, and as at 50B to the bracket 41. The connections for the parallel links include hubs or collars welded to the plates forming brackets 44 and 45. Pins are mounted in the collars and extend through sleeves on the links to form the pivots.

A telescoping or sliding control bracket 54 is mounted over the pole 43 toward the forward end of the pole from brackets 44 and 45, as shown and includes suitable roller guides 55 that are mounted on pins 55 on opposite sides of the hitch pole. The bracket 54 has top and bottom plates so that the pins extend through both the top and bottom plates of the bracket.

A pair of control links 56 are connected between opposite sides of the control bracket 54 with pivot pins 57 and these links 56 each then extend so that they are pivotally mounted at the forward ends of the brackets 41,41 with pins 58.

Because the bracket 54 can slide relative to the pole 43, its position on the pole is determined by the use of a hydraulic cylinder 60 that has its one end fastened as at 61 to a bracket 62 that is fixed to the pole 43, through bracket 45, and the rod end of the cylinder 60 is connected as at 63 to a bracket 64 fixed to the movable control bracket 54. The cylinder 60 can be controlled through a suitable valve 65 that can be mounted directly on the fifth wheel assembly and can be carried with it, and the hydraulic power can be supplied by a power pack providing a hydraulic pump indicated at 66 which may be powered from a battery source and include a hydraulic pump and reservoir. Valve 33 also may be mounted on the gooseneck of the hitch pole, but is shown detached for clarity, as are the pump 66 and valve 65.

Operation of the cylinder 60 from its extended position which is shown in solid lines in FIG. 1 to its retracted position will cause the bracket 54 to be retracted (moved rearwardly) along the pole 43, and thus the control links 56 will be moved rearwardly under compression. Because the parallel link sets 46 and 50 guide the movement of the forward ends of the beams 12 and 13, the beams 12 and 13 will be forced to collapse together, or in other words move in toward the central longitudinal axis of the trailer assembly. This action therefore narrows the width of the trailer for transport of narrow loads, or empty transport. The wide position shown in solid lines would be used for hauling overwidth loads.

A releasable, adjustable but fixed length latching cross beam 67 is used for transporting loads. The beam 67 may be a square tube, if desired and made in two sections that are adjustable. The sections are held so the latching beam is of fixed length when in use and the length is adjusted to correspond to the desired width of the trailer during transport. The beam sections may be bolted together using adjustment holes in the beams. The beam 67 is pivoted to one end of beam 13 as at 67A and is latched to the beam 12 through an adjustable mechanism that permits forcing the ends of the longitudinal beams 12 and 13 together when latching the frame to make sure they are held at the desired spacing. The latch assembly 68 includes a bracket 68A (see FIGS. 1 and 2A) fixed to the end of the beam 12. The bracket 68A has a slot that receives a crank 68B which is threaded into a block 68C fixed to the end of the beam 67. The crank threads into the block 68C and the tubular beam. The crank has a thrust collar 68D fixed to the crank screw and when the beam 67 is to be fastened between the longitudinal beams 12 and 13, the crank can be threaded out as shown in dotted lines in FIG. 1 and placed in the slot of bracket 68A. A lock pin 68E can be slipped into bracket 68A to lock the crank in the slot. Then the crank is threaded to tighten the thrust collar 68D against the bracket 68A to force the beams 12 and 13 together until the beam 67 abuts against the bracket 68A so the width of the trailer is established at the length of beam 67. The opening of the beam can be the reverse process. Other adjustment or latching devices such as a ratchet mechanism can be used in place of the screw if desired. Also, the pivot pin at 67A may be removable to permit complete removal of the beam 67.

In addition to the hinged rear beam 67 at least one removable cross beam shown generally at 70 is used for support and comprises two telescoping tube sections 70A and 70B (see FIG. 1). Support clamps or hangers indicated generally at 71 are used for supporting the opposite ends of the cross beam assemblies. As shown in FIGS. 8 and 9, each of the cross tube sections 70A and 70B has a hook type support indicated at 72 at their free ends. The hook type supports 72 include a depending leg 72A that is made so that it will fit over a cross support pin 73 of the hanger or clamp assemblies 71. The hanger clamp assemblies 71 each include a pair of side plates 74 that are spaced apart in longitudinal direction of the beam, and held with suitable cross members including pin 73 and other cross members if desired. The plates 74 are recessed or notched to fit against the outer vertical surface and the top surface of the beam portions 20. The plates 74 each include a vertical leg 75 and a top leg 76. The vertical leg 75 fits along the outside of each of the tubes 12 and 13, and the top legs 76 rest on the top surface of the longitudinal beams. The cross pin 73 is thus positioned at a level just below the lower surfaces or plane of the bottom side of the beams 12 and 13, and as shown the cross beams 70 extend between, and the supports 72 rest against, the bottom surfaces of the longitudinal beams 12 and 13. The top legs 76 rest on the top surfaces of the longitudinal beams.

As shown in FIG. 8, a latch plate 80, which is a generally L shaped unit, is mounted to a sleeve 81 that in turn is mounted on a pin 82 that passes between the plates 74. The sleeve 81 is pivotally mounted about the pin 82. The latch plate 80 is of size so that when the plates 74 are properly positioned against one of the longitudinal beams, the leg 80A that depends from the main portion of the latch plate 80 will fit on the opposite side of the beam from the leg 75. This means that the leg 80A acts as a clamp or retainer, and a lock pin 83 can then be passed through provided apertures in plates 74 and be positioned above the latch plate to hold the latch plate in position and positively lock the hangers 71 onto the longitudinal beams.

It should be noted that in installing a cross beam 70 there is only need for enough clearance under the longitudinal beams for the cross beams when they are resting on the ground. The hangers 71 will pivot outwardly as indicated by the arrow 85, to lay to the exterior or the outside of the longitudinal beams as shown in dotted lines in FIG. 9, and then with the latch plate 80 lifted about its pivot pin, and the lock pin 83 removed, the hangers can be pivoted up so that the legs 76 will rest on the top of the longitudinal beam. The latch plate can be put into position with the leg 80A on the interior of the longitudinal beams and then the lock pin put into place to positively latch the hangers.

Thus the hangers do nothing to weaken the longitudinal beams. They do not require any holes or drilling, and are made so that they can be installed together with the cross beams after the trailer has been lowered down and backed into position relative to the boat or other equipment that is to be moved. The cross beams 70 are completely removed (beam 67 is pivoted open), the trailer backed into position to provide for lifting the load, and then the cross beams installed. The cross beams can be moved longitudinally to any desired position for great adaptability.

It should be noted that many of the large boats are supported on wooden cradles or supports so that they will be resting off the ground. Such supports will generally have blocking under them so that the trailer can be backed around the wooden cradle, the cross beams placed beneath the cradle, and then the clamps put into position, and the longitudinal beams of the trailer lifted with the hydraulic cylinders as previously explained to lift the load for transport. When the place of unloading has been reached, the lock pin 39A is pulled out to permit the hitch member 37 to pivot as explained, and the cylinders 30 will be operated to lower the frame so that the boat cradle or blocking will rest on the ground. Then the cross beam 67 is opened and cross beams 70 removed and any blocking removed so that the trailer can be pulled away from the load. There is a clear span between the side beams.

It further should be noted that the longitudinal beams 12 and 13 can be provided with upwardly open sockets 86, such as short tube sections to receive guide members 87 that have support tubes 88 with universally pivoted pads 87A at the top ends which engage the boat. The upright support tubes 88 can be adjusted in vertical length to accommodate different size loads. The guide members are used if the boat does not have an independent cradle or support made out of wood. The guide members may be configured to help support and stabilize loads that are supported by the trailer.

In a modified form of the wheel supports, instead of dual wheels, single wheels are mounted on the outside of the longitudinal beams 12 and 13 to leave a wider clear span area between the longitudinal beams. Such a device is shown in FIG. 9 and in detail in FIGS. 10, 11 and 12. In the modified form, the wheel support member indicated generally at 90 has a wheel and spindle assembly 91 including a spindle 91A mounted on a spring support 92 that spring loads the wheel and spindle assembly 91 relative to the wheel carriage frame 93. The carriage frame 93 is built substantially the same as previously described and includes a horizontal beam 95 which has vertical legs 94, and which slides between the gusset plates 22 on the bridge assembly 15. Hydraulic cylinders are mounted into vertical legs 94 as previously described for raising and lowering the longitudinal beams of the trailer.

The wheels and spindle assemblies 91 are guided on opposite sides of the main beam 95 of the carriage 93 through the use of guideways 96. The spindles 91A in turn are mounted fixedly to plates 97 which vertically slide in guideways 96 under control of the spring 92. Note that the plates 97 are on opposite sides of the beam 95, and the guideways 96 provide stability for the wheel which is rotatably mounted on the spindle 91A. The plates 97 are held together with a suitable cross member 97A to hold the plates in position.

It can be seen that in this form of the invention there will be a moment exerted about the main beam tending to twist the main beam. However, this force would be exerted as an upward force on the outside of the main beams (see FIGS. 9 and 11), and it should be noted that on the cross beam hanger assemblies 71, the hooks 72A for the hangers are located toward the outside of the beams and the reactive force from the cross beam members tends to resist the moment exerted by the mounting wheels. Note in particular that the load carried through the pins 73 would be generally downwardly from any load carried on the cross members 70, and even if there is a moment tending to twist the beams from wheel assemblies 91, the reactive force between the pins 73, the hook 72A and the upper surface of the cross beams would hold the longitudinal beams 12 and 13 from twisting, and provide a very rigid assembly.

In the modified form of the assembly, the wheels could be tandem or even triple axle, mounted in exactly the same way, using individual guideways 96 and sliding plates 97 along the beam 95.

It should also be noted that in raising and lowering the longitudinal beams the hitch pole assembly, where it attaches to the fifth wheel, or to other hitch members would have to provide some movement. In addition to the pivoting section shown this movement can be accomplished in many ways, for example by having a pivot connection that could be hydraulically operated at the same time that the cylinders for raising and lowering the longitudinal beams are operated. In most instances the hitch pole will hold the longitudinal beams about level in the raised transport position.

The device is simple to use, rugged and practical. The quickly adjusted width, the lifting feature, and the removable hangers for the cross beams cooperate to make the unit adaptable for any situation.

What is claimed is:

1. An equipment trailer comprising a pair of longitudinally extending frame members, means joining said frame members at a leading end thereof adapted to be connected to a prime mover, said means joining including a hitch pole assembly, link means mounted between said hitch pole assembly and each of said longitudinally extending frame members adjacent the leading ends thereof, including portions on the longitudinally extending frame members movably mounted relative to said hitch pole assembly, power means to move said movably mounted portions relative to the hitch pole to cause said longitudinally extending frame members to move in direction toward or away from each other under control of said power means to vary the spacing between said longitudinally extending frame members, at least one removable cross beam positioned rearwardly of said link means, each cross beam comprising telescoping first and second portions spanning the width between said longitudinally extending frame members, and support means at opposite ends of said cross beam to support the cross beam on the longitudinally extending frame members, said support means on at least one end of the cross beam comprising a hanger means including a latch member which fits over the top of the associated longitudinally extending frame member and having a portion passing to the outside of the associated longitudinally extending frame member, and means between at least one end of the cross beam and the hanger means to support the respective cross beam against lower side portions of the associated longitudinally extending frame member and adjacent the exterior side of said associated longitudinally extending frame member.

2. The combination as specified in claim 1 and vertically adjustable wheel means supporting said longitudinally extending frame members, said vertical adjustable wheel means comprising support members for said longitudinal frame members.

3. The combination as specified in claim 2 wherein said wheel means comprise individual carriages having fore and aft vertically extending frame members, said longitudinally extending frame members each including a bridge structure of size to receive on individual carriage, said bridge structures including guide plate means for slidably guiding the vertical frame members of said carriages to permit vertical sliding movement between said longitudinally extending frame members and said carriages.

4. The combination as specified in claim 3 and hydraulic cylinder structures connected between said bridge members and said vertical frame members of said carriages, respectively, said hydraulic cylinder means being actuable to raise and lower said longitudinally extending frame members relative to said carriages.

5. The combination as specified in claim 4 wherein said carriages comprise tandem wheel assemblies which support said longitudinally extending frame members, and said hitch pole assembly including a folding member permitting the longitudinally extending frame members to be raised and lowered substantially parallel to the ground while the hitch pole assembly remains connected to a prime mover.

6. The combination as specified in claim 1 wherein said link means includes a control bracket slidably mounted for longitudinal movement relative to the hitch pole assembly, said link means including separate pairs of parallel links on opposite sides of said hitch pole assembly pivotally mounted to said control bracket and to the longitudinally extending frame members, respectively, said movable control bracket being slidably in longitudinal direction of the trailer by said power means.

7. The trailer of claim 1 further comprising a latching beam at the rear portions of said longitudinally extending frame members, said latching beam extending transversely of said trailer and being removably detachable from the longitudinally extending frame members to maintain a desired spacing of said longitudinally extending frame members.

8. The combination as specified in claim 1 and socket means defined in said longitudinally extending frame members and having upwardly opening apertures, and support brace means including a member of size to fit within said socket means which extends upwardly from said longitudinally extending frame members to support a load carried by the trailer.

9. The combination as specified in claim 1 wherein said hanger means includes releasable latch members pivotally mounted for movement from a position wherein the hanger means are retained on said longitudinally extending frame members to a second position which permits said hanger means to be removed from said longitudinally extending frame members.

10. A wheel support carriage member for tailers having longitudinally extending frame members, said frame members each including a bridge section for mounting a wheel carriage, said bridge section comprising a bridge beam portion generally parallel to and spaced above the main portion of said longitudinally extending frame members, means joining said bridge beam portions to the main frame beam portions comprising guide plates fixedly positioned on opposite sides of both the bridge beam portion and the corresponding main beam portions at both ends of each bridge beam portion, the area below said bridge beam portions being unobstructed, said wheel carriages including fore and aft vertically extending frame members each slidably guided between a pair of said guide plates and positioned below said bridge beam portions, hydraulic cylinder means connected to said bridge beam portions and to the lower portions of said vertically extending frame members, said hydraulic cylinder means fitting substantially within said vertically extending frame members of said wheel carriages and being actuable to force the wheel carriages and the bridge beam portions to separate, said wheel carriages each including at least one spindle member mounted thereon, a single wheel on each spindle member mounted on the wheel carriages, said single wheel being positioned to the outside of the respective associated longitudinally extending frame member, said wheel carriages including a carriage junction beam connected to the fore and aft vertically extending frame members, guide means on opposite sides of said carriage junction beam, and slidable means slidably mounted in said guide means on opposite sides of said carriage junction beam, and thus being spaced apart by the width of the carriage support beam, said spindle being fixedly attached to said slidable means below the carriage junction beam, and spring means connected between said carriage junction beam and the slidable means to spring mount said spindle member while permitting the slidable means to move in said guide means.

11. For use in combination with a cross beam and longitudinal frame member of a trailer, a hanger for attaching such cross beam to a longitudinal frame member of a trailer, said cross beam member having a support surface which extends past a longitudinally extending side surface of one longitudinal frame member when the cross beams are in a desired position and hook means on one end of the support surface, said hanger having a hanger frame, a pin attached to said hanger frame and extending in longitudinal direction of a longitudinal frame member with which the hanger is used and positioned to support the hook means of an associated cross beam, said hanger frame including a first portion that seats against a longitudinally extending side longitudinal frame member with which it is used, a latch plate mounted on said first portion, said latch plate having a first section extending generally parallel to the plane of an associated cross beam and adapted to extend across a surface of an associated longitudinal frame member on the opposite side of an associated longitudinal frame member from the longitudinally extending side surface which is engaged by an associated cross beam, said latch plate further including a latching leg on a side of an associated longitudinal frame member opposite from the side of the longitudinal frame member on which the first portion seats when the latch plate is pivoted to a first position, said latch plate being pivotable to a second position where it clears an associated longitudinal frame member, and removable lock means to hold the latch plate in said first position.

12. The combination of claim 11 wherein said hanger frame comprises a pair of spaced apart frame members, said pin and said latch plate filling between said spaced apart frame members.

* * * * *